US008719244B1

(12) United States Patent
Pasca

(10) Patent No.: US 8,719,244 B1
(45) Date of Patent: May 6, 2014

(54) METHODS AND SYSTEMS FOR RETRIEVAL OF INFORMATION ITEMS AND ASSOCIATED SENTENCE FRAGMENTS

(75) Inventor: Alexandru Marius Pasca, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1538 days.

(21) Appl. No.: 11/087,146

(22) Filed: Mar. 23, 2005

(51) Int. Cl.
*G06F 17/30* (2006.01)

(52) U.S. Cl.
USPC .......................................................... 707/706

(58) Field of Classification Search
USPC .......................................................... 707/706
See application file for complete search history.

(56) References Cited

U.S. PATENT DOCUMENTS

| 5,423,032 | A | * | 6/1995 | Byrd et al. ........................ 707/5 |
| 5,659,742 | A | * | 8/1997 | Beattie et al. ............... 707/104.1 |
| 5,701,459 | A | * | 12/1997 | Millett et al. ..................... 707/3 |
| 5,717,912 | A | * | 2/1998 | Millett et al. ..................... 707/3 |
| 5,717,913 | A | * | 2/1998 | Driscoll ............................ 707/5 |
| 5,721,902 | A | * | 2/1998 | Schultz ............................. 707/4 |
| 5,842,217 | A | * | 11/1998 | Light ............................. 707/101 |
| 5,893,092 | A | * | 4/1999 | Driscoll ............................ 707/5 |
| 5,907,821 | A |   | 5/1999 | Kaji et al. |
| 5,933,145 | A | * | 8/1999 | Meek ............................. 715/835 |
| 5,933,822 | A | * | 8/1999 | Braden-Harder et al. ........ 707/5 |
| 6,154,213 | A | * | 11/2000 | Rennison et al. ............. 715/854 |
| 6,167,395 | A | * | 12/2000 | Beck et al. ........................ 707/3 |
| 6,411,924 | B1 | * | 6/2002 | de Hita et al. ..................... 704/9 |
| 6,473,729 | B1 |   | 10/2002 | Gastaldo et al. |
| 6,526,398 | B2 | * | 2/2003 | Wolff et al. ....................... 707/1 |
| 6,675,159 | B1 | * | 1/2004 | Lin et al. ........................... 707/3 |
| 6,766,316 | B2 | * | 7/2004 | Caudill et al. .................... 707/3 |
| 7,177,795 | B1 | * | 2/2007 | Chen et al. ........................ 704/9 |
| 7,412,385 | B2 |   | 8/2008 | Brockett et al. |
| 2003/0061200 | A1 | * | 3/2003 | Hubert et al. ..................... 707/3 |
| 2003/0061201 | A1 | * | 3/2003 | Grefenstette et al. ............ 707/3 |
| 2003/0204400 | A1 |   | 10/2003 | Marcu et al. |
| 2004/0059565 | A1 |   | 3/2004 | Dehlinger et al. |
| 2006/0111896 | A1 |   | 5/2006 | Menezes et al. |
| 2006/0239648 | A1 | * | 10/2006 | Varghese ........................ 386/95 |

OTHER PUBLICATIONS

R. Bunescu and M. Pasca. 2006. "Using Encyclopedic Knowledge for Named Entity Disambiguation." In Proceedings of the 11th Conference of the European Chapter of the Association for Computational Linguistics (EACL-06), Trento, Italy.*
M. Pasca. 2005. "Mining Paraphrases from Self-anchored Web Sentence Fragments." A. Jorge et al. (Eds.): PKDD 2005, LNAI 3721, pp. 193-204. Springer-Verlag Berlin Heidelberg.*
M. Pasca, D. Lin, J. Bigham, A. Lifchits and A. Jain. 2006. "Names and Similarities on the Web: Fact Extraction in the Fast Lane." In Proceedings of the 21st International Conference on Computational Linguistics and 44th Annual Meeting of ACL, Sydney, Jul. 2006. pp. 809-816.*

(Continued)

*Primary Examiner* — Ajay Bhatia
*Assistant Examiner* — Hubert Cheung
(74) *Attorney, Agent, or Firm* — Middleton Reutlinger

(57) ABSTRACT

Methods and systems for retrieval of information items and associated sentence fragments are described. One method described comprises identifying at least a first entry in an index relevant to a search query, wherein the first entry comprises a first information item and a first associated sentence fragment, and wherein the index comprises a plurality of information items and associated sentence fragments, and generating a search result set relevant to the search query comprising at least the first information item.

25 Claims, 9 Drawing Sheets

(56) References Cited

OTHER PUBLICATIONS

J. Col. Zoom inventors and inventions. Enchanted Learning. 2004. www.enchantedlearning.com.

C. Fellbaum, editor. WordNet: An Electrical Lexical Database and Some of its Applications. MIT Press. 1998.

Schutze and Pedersen. "Information Retrieval Based on Word Senses," Proceedings of the 4th Annual Smyposium on Document Analysis and Information Retrieval. 1995. pp. 161-175. Xerox Paolo Alto Research Center, CA, USA.

Chinchor and Marsh, "MUC-7 Information Extraction Task Definition Version 5.1" Proceedings of the 7th Message Understanding Conference, 1998.

Brants, "TnT-A Statistical Part-of-Speech Tagger," Proceedings of the 6th Conference on Applied Natural Language Processing (ANLP-00), 2000, pp. 224-231, Saarland University, Seattle WA.

Barzilay and Lee, "teaming to Paraphrase: An Unsupervised Approach Using Multiple-Sequence Alignment" Proceedings of the 2003 Human Language Technology Conference (HLT-NAACL-03), 2003, pp. 16-23. Edmonton, Canada.

Barzilay and McKeown, "Extracting Paraphrases from a Parallel Corpus," Proceedings of the 39th Annual Meeting of the Association for Computational Linguistics (ACL-01), 2001, pp. 50-57, Toulouse, France.

Chieu and Lee, "Query Based Event Extraction Along Timeline," Proceedings of the 27th ACM Conference on Research and Development in Information Retrieval, DSO National Laboratories, Sheffield, United Kingdom.

Collins. "Head-Driven Statistical Models for Natural Language Parsing," PhD thesis, University of Pennsylvania, Philadelphia, 1999.

Dolan, Quirk, and Brockett, "Unsupervised Construction of Large Paraphrase Corpora: Exploiting Massively Parallel News Sources." Proceedings of the 20th International Conference on Computational Linguistics, 2004, pp. 350-356, Geneva Switzerland.

Filatova and Hovy, "Assigning Time-Stamps to Event-Clauses," Proceedings of the 39th Annual Meeting of the ACL, 2001, pp. 88-95, Toulouse, France.

Gonzalo, Verdejo, Chugur, and Cigarran, "Indexing with WordNet synsets can improve text retrieval," Proceedings of the 17th International Conference on Computational Linguistics and 36th Annual Meeting of the Association for Computational Linguistics, Workshop on Usage of WordNet in Natural Language Processing Systems, 1998.

Hearst, "Automatic Acquisition of Hyponyms from Large Text Corpora," Proceedings of the 14th International Conference on Computational Linguistics, 1992, pp. 539-545, Nantes France.

Jacquemin, Klavans, and Tzoukermann, "Expansion of Multi-Word Terms for Indexing and Retrieval Using Morphology and Syntax," Proceedings of the 35th Annual Meeting of the Association for Computational Linguistics, 2000, pp. 24-31, Madrid Spain.

Mani and Wilson, "Robust Temporal Processing of News," Proceedings of the 38th Annual Meeting of the Association of Computational Linguistics, 2000, pp. 69-76, Hong Kong.

Mitra, Singhal, and Buckley, "Improving Automatic Query Expansion," Proceedings of the 21st ACM Conference on Research and Development in Information Retrieval, 1998, pp. 206-214, Melbourne Australia.

Phillips and Riloff, "Exploiting Strong Syntactic Heuristics and Co-Training to Learn Semantic Lexicons," Proceedings of the Zconference on Empirical Methods in Natural Language Processing, 2002, pp. 125-132. Philadelphia, Pennsylvania.

Pustejovsky, Gaizauskas, and Katz, "TimeML: Robust Specification of Event and Temporal Expressions in Text," Proceedings of the 5th International Workshop on Computational Semantics, 2003, Tilburg Netherlands.

Ravichandran and Hovy, "Learning Surface Text Patterns for a Question Answering System," Proceedings of the 40th Annual Meetings of the Association of Computational Linguistics, 2002, Pennsylvania.

M. Remy, Wikipedia: The Free Encyclopedia Online, Information Review, 26 (6); 434, 2002.

Schiffman, Mani, and Concepcion, "Producing Biographical Summaries: Combining Linguistic Knowledge with Corpus Statistics," Proceedings of the 39th Annual Meeting of the Association for Computational Linguistics, 2001, pp. 450-457, Toulouse France.

Shinyama, Sekine, and Sudo, "Automatic Paraphrase Acquisition from News Articles," Proceedings of the Human Language Technology Conferences, 2002, pp. 40-48, San Diego, California.

Zukerman and Raskutti, "Lexical Query Paraphrasing for Document Retrieval," Proceedings of the 19th International Conference on Computational Linguistics, 2002, pp. 1177-1183, Taipei, Taiwan.

Allan, Khandelwal and Gupta, "Temporal Summaries of News Topics," Proceedings of the 24th ACM Conference on Research and Development in Information Retrieval (SIGIR-01), pp. 10-18, New Orleans. Louisiana, 2001.

Gildea and Jurafsky, "Automatic Labeling of Semantic Roles," Proceedings of the 38th Annual Meeting of the Association of Computational Linguistics (ACL-00), pp. 512-520. Hong Kong, 2000.

D. Worlton, "A Computational Approach to Paraphaase Recognition," The University of Texas at Dallas, Submitted for Award of Summa cum Laude, Apr. 22, 2005, pp. 1-57.

D. Yarowsky, "Word-Sense Disambiguation Using Statistical Models of Roget's Categories Trained on Large Corpora," AT&T Bell Laboratories, in Proceedings, Coling-1992, pp. 1-11.

W. Gale et al., "A Program for Aligning Sentences in Bilingual Corpora," Computational Linguistics, 1994, pp. 1-30.

P. Brown et al., "The Mathematics of Statistical Machine Translation: Parameter Estimation", Association for Computation Linguistics, vol. 19, No. 2, Jun. 1993, pp. 263-311.

C. Quirk et al., "Monolingual Machine Translation for Paraphrase Generation," Natural Language Processing Group, Processing of the 2004 Conf. on Empirical Methods . . . , 2004, pp. 1-8.

R. Barzilay et al., "Extracting Paraphrases from a Parallel Corpus," Computer Science Dept., Annual Mtg. Assoc. for Computational Linguistics, 2001, pp. 1-8.

R. Barzilay et al., "Learning to Paraphrase: An Unsupervised Approach Using Multiple-Sequence Alignment," Proceedings of HLT-HAACL 2003, Main Papers, Edmonton, May-Jun. 2003, pp. 16-23.

E. Brill et al., "Automatically Harvesting *Katakana*-English Term Pairs from Search Engine Query Logs," Microsoft Research, In Proceedings of the Sixth Language Processing Pacific Rim Symposium, NLPRS, 2001, pp. 393-399.

D. Lin et al., "DIRT—Discovery of Inference Rules from Text," University of Alberta, Department of Computing Science, In Proceedings of the ACM SIGKDD Conf. on Knowledge Disc. and Data Mining, 2001, www.cs.ualberta.ca/.about.lindek/minipar.htm, 2001, pp. 323-328.

B. Pang et al., "Syntax-based Alignment of Multiple Translations: Extracting Paraphrases and Generating New Sentences," HLT-NAACL Main Proceedings, 2003, pp. 181-188.

A. Ibrahim, "Extracting Paraphrases from Aligned Corpora," Massachusetts Institute of Technology Dept. of Electrical Eng. and Computer Science, Submitted to the Department of Electrical Engineering and Computer Science on Aug. 23, 2002, pp. 2-60.

C. Quirk et al., "Dependency Treelet Translation: Syntactically Informed Phrasal SMT," Proceedings of the 43rd Annual Meeting of the ACL, Association for Computer Linguistics, Ann Arbor, Jun. 2005, pp. 271-279.

E. K. Ringger et al., "A Fertility Channel Model for Post-Correction of Continuous Speech Recognition," Proceedings of the 4th International Conference on Spoken Language Processing (ICSLP'96), Philadelphia, PA. Oct. 1996, pp. 1-4.

B.J. Kang et al., "Automatic Transliteration and Back-Transliteration by Decision Tree Learning," Department of Computer Science, Proceedings of 2nd International Conference on Language Resources and Evaluation, Athens, Greece May-Jun. 2000, pp. 1135-1141.

Y. Shinyama et al., "Automatic Paraphrase Acquisition from News Articles," Department of Computer Science, NY University, Proceedings of Human Language Technology Conference 2002, pp. 40-46.

(56) References Cited

OTHER PUBLICATIONS

K.S. Jeong et al., "Automatic Identification and Back-Transliteration of Foreign Words for Information Retrieval," Information Processing and Management: An International Journal, Oxford, NY, Pergamon Press. 1999, pp. 523-540.

B. Dolan et al., "Unsupervised Construction of Large Paraphrase Corpora: Exploiting Massively Parallel News Source," Natural Language Processing Group, Microsoft Research, Proceedings of COLING 2004, Geneva Switzerland, pp. 1-7.

B. G. Stalls et al., "Translating Names and Technical Terms in Arabic Text," Proceedings of the COLING/ACL Workshop on Computational Linguistics, 1998, pp. 1-8.

K. Knight et al., "Machine Transliteration," Information Sciences Institute, Proceedings of the 35$^{th}$ Annual Meeting of the Association for Computational Linguistics, 1997, pp. 128-135.

Y.Y. Wang et al., "Decoding Algorithm in Statistical Machine Translation," Proceedings of 35$^{th}$ Annual Meeting of the Association of Computational Linguistics, 1997, pp. 1-7.

Y. Al-Onaizan et al., "Machine Transliteration of Names in Arabic Text," Proceedings of ACL Workshop on Computational Approaches to Semitic Languages, 2002, pp. 1-14.

B.J. Kang et al., "English-Korean Automatic Transliteration/Back-transliteration System and Character Alignment," Department of Computer Science, The 38$^{th}$ Annual Meeting of the Association for Computational Linguistics, Oct. 1-8, 2000, pp. 1-2.

Y. Al-Onaizan et al., "Translating Named Entities Using Monolingual and Bilingual Resources," Information Sciences Institute, Proceedings of the 40$^{th}$ Annual Meeting of the Association for Computational Linguistics (ACL), Philadelphia, PA, Jul. 2002, pp. 400-408.

P. Virga et al., "Transliteration of Proper Names in Cross-Lingual Information Retrieval," John Hopkins University, Proceedings of the ACL Workshop on Multi-lingual Named Entity Recognition 2003, pp. 1-8.

R. Bunescu and M. Pasca. 2006. "Using Encyclopedic Knowledge for Named Entity Disambiguation." In *Proceedings of the 11$^{th}$ Conference of the European Chapter of the Association for Computational Linguistics (EACL-06)*, Trento, Italy.

Y. Chiaramella, P. Mulhern, M. Mechkour, I. Ounis, M. Pasca. 1998. "Towards a Fast Precision-Oriented Image Retrieval System." In *Proceedings of the 21$^{st}$ Annual International ACM SIGIR Conference on Research and Development in Information Retrieval*, Aug. 24-28, 1998, Melbourne, Australia. SIGR '98.

S. Harabagiu, D. Moldovan, M. Pasca, M. Surdeanu, R. Mihalcea, R. Girju, V. Rus, F. Lacatusu, P. Morarescu and R. Bunescu. 2001. "Answering complex, list and context questions with LCC's Question-Answering Server." In *Proceedings of the Tenth Text Retrieval Conference (TREC-10)*, Gaithersburg, Maryland, Nov. 13-16, 2001.

S. Harabagiu, M. Pasca and V. Lacatusu. 2001. "Dialogue Management for Interactive Question Answering." In *Proceedings of the Fourteenth International Florida Artificial Intelligence Research Society Conference*, Key West, Florida.

S. Harabagiu, M. Pasca and S. Maiorano. 2000. "Experiments with Open-Domain Textual Question Answering." In Proceedings of the COLING-2000, Association for Computational Linguistics/Morgan Kaufmann, Aug. 2000. Saarbruken, Germany.

S. Harabagiu, D. Moldovan, M. Pasca, R. Mihalcea, M. Surdeanu, R. Bunescu, R. Girju, V. Rus, and P. Morarescu. 2000. "FALCON: Boosting Knowledge for Answer Engines." In the *Proceedings of Text Retrieval Conference (TREC-9)*, 2000. Gaithersburg, Maryland.

S. Harabagiu and M. Pasca. 1999. "Integrating Symbolic and Statistical Methods for Prepositional Phrase Attachment." In Proceedings of the Twelfth International Florida AI Research Society Conference. Orlando, Florida May 3-5, 1999. AAAI Press. National Language Processing.

S. Harabagiu, M. Pasca and S. Maiorano. 2001. "A Knowledge-Based Answer Engine for Open-Domain Questions." *International Journal on Artificial Intelligence Tools*, vol. 10, Nos. 1&2, 199-224. World Scientific Publishing Company.

S. Harabagiu and M. Pasca. 2000. "Mining Textual Answers with Knowledge-Based Indicators." In *Proceedings of FLAIRS-2000*, May 2000, Orlando FL, pp. 214-218.

S. Harabagiu, S. Maiorano, and M. Pasca. 2003. "Open-Domain Textual Question Answering Techniques." *Natural Language Engineering 9* (3): 231-267. Cambridge University Press.

S. Harabagiu, D. Moldovan, M. Pasca, R. Mihalcea, M. Surdeanu, R. Bunescu, R. Girju, V. Rus, and P. Morarescu. 2001. "The Role of Lexico-Semantic Feedback in Open-Domain Textual Question-Answering." In *Proceedings of the 39th Annual Meeting on Association for Computational Linguistics*, Toulouse, France. pp. 282-289.

D. Moldovan, M. Pasca, S. Harabagiu and M. Surdeanu. 2003. "Performance Issues and Error Analysis in an Open-Domain Question Answering System." *ACM Transactions on Information Systems*, vol. 21, No. 2, Apr. 2003, pp. 133-154.

D. Moldovan, S. Harabagiu, M. Pasca, R. Mihalcea, R. Girju, R. Goodrum and V. Rus. 2000. "The Structure and Performance of an Open-Domain Question Answering System." In *Proceedings of the Conference of the Association for Computational Linguistics (ACL-2000)*, 563-570. Available online at: http://citeseer.ist.psu.edu/moldovan00structure.html.

I. Ounis and M. Pasca. 1997 IEEE. "An Extended Inverted File Approach for Information Retrieval." In *Proceedings of the 1997 International Symposium on Database Engineering & Applications*. pp. 397-402.

I. Ounis and M. Pasca. 1998. "Modeling, Indexing and Retrieving Images Using Conceptual Graphs." In *Proceedings of the 9th International Conference on Database and Expert Systems Applications*. Springer-Verlag, London, UK. pp. 226-239.

I. Ounis and M. Pasca. 1998. "A Promising Retrieval Algorithm for Systems based on the Conceptual Graphs Formalism." In *Proceedings of the 1998 International Symposium on Database Engineering & Applications*. IDEAS 1998.

I. Ounis and M. Pasca. 1999 IEEE. "The Relief Retrieval System." In *Proceedings of 1997 IEEE Knowledge and Data Engineering Exchange Workshop*. Grenoble Cedex France.

I. Ounis and M. Pasca. 1998. "RELIEF: Combining expressiveness and rapidity into a single system." In *Proceedings of the 21st Annual International ACM SIGIR Conference on Research and Development in Information Retrieval*, Aug. 24-28, 1998, Melbourne, Australia. SIGIR '98, pp. 266-274.

M. Pasca. CIKM 2004. "Acquisition of Categorized Named Entities for Web Search." In *Proceedings of the thirteenth ACM international conference on Information and knowledge management*. Washington, D.C. pp. 137-145.

M. Pasca and P. Dienes. 2005. "Aligning Needles in a Haystack: Paraphrase Acquisition Across the Web." *R. Dale et al. (Eds.): IJCNLP 2005, LNAI 3651*, pp. 119-130. Springer-Verlag Berlin Heidelberg.

M. Pasca. 2002. "Answer Finding Guided by Question Semantic Constraints." In *Proceedings of the Fifteenth International Florida Artificial Intelligence Research Society Conference*, May 14-16, 2002. Pensacola Beach, Florida.

M. Pasca. CICLing 2005. "Finding Instance Names and Alternative Glosses on the Web: WordNet Reloaded." *A. Gelbukh (Ed.): CICLing 2005, LNCS 3406*, pp. 280-292. Springer-Verlag Berlin Heidelberg.

M. Pasca and S. Harabagiu. SIGIR 2001. "High Performance Question/Answering." In *Proceedings of the 24th annual international ACM SIGIR conference on Research and development in information retrieval table of contents*, New Orleans, Louisiana. pp. 366-374.

M. Pasca, D. Lin, J. Bigham, A. Lifchits, and A. Jain. 2006. "Organizing and Searching the World Wide Web of Facts—Step One: The One-Million Fact Extraction Challenge." In *Proceedings of the 21$^{st}$ National Conference on Artificial Intelligence (AAAI-06)*, pp. 1400-1405, Boston, Massachusetts.

M. Pasca. 2002. "Processing Definition Questions in an Open-Domain Question Answering System." *Supplied by the British Library—"The world's knowledge."* AAAI-2002.

M. Pasca. 2003. "Question-Driven Semantic Filters for Answer Retrieval." International Journal of Pattern Recognition and Artificial Intelligence. vol. 17, No. 5 (2003) 741-756. World Scientific Publishing Company.

(56) References Cited

OTHER PUBLICATIONS

M. Pasca. 2001. "Unveiling Next Generation Search Technologies: Answer Extraction on the Web." 2nd International Conference on Internet Computing (IC-2001), Jun. 2001, Las Vegas, Nevada.

M. Pasca and B. Van Durme. 2007. "What You Seek Is What You Get: Extraction of Class Attributes from Query Logs." In *Proceedings of the 20th International Joint Conference on Artificial Intelligence (IJCAI-07)*, pp. 2832-2837, Hyderabad, India.

M. Pignataro, M. Pasca, and P. Franchin. 2000. "Post-buckling analysis of corrugated panels in the presence of multiple interacting modes." Thin Walled Structures, Elsevier Science Ltd., vol. 36, pp. 47-66.

\* cited by examiner

METHODS AND SYSTEMS FOR RETRIEVAL OF INFORMATION ITEMS AND ASSOCIATED SENTENCE FRAGMENTS

FIELD OF THE INVENTION

The present invention relates generally to information extraction and, more particularly, to methods and systems for retrieval of information items and associated sentence fragments.

BACKGROUND OF THE INVENTION

Search engines can be used to locate documents from a large collection of documents, such as documents stored on a computer or in a distributed database, such as the World Wide Web (WWW) or an intranet. Search engines can compile and organize an index of documents by crawling or reading documents, such as web pages. Generally, such indexes are organized so that the index associates the contents of the documents, such as words and images, with the respective documents. The search engine can locate documents in response to a search query by matching terms or partial terms from a search query with the contents of the documents. A search result set generated by a search engine in response to a search query generally contains links to previously indexed documents.

Some users of search engines may be searching for specific information, such as a date or the name of a person or a place. If a user enters a search query for a specific information item in a search engine, the search engine may generate a search result set containing links to previously indexed documents. The search result set may contain a summary or snippet of each document. While the summaries or snippets may be based on the search query, they may not contain the user's desired specific information item. This may require the user to select (or "click on") several of the documents cited in the search result set and review the documents to find the information sought. Reviewing documents linked to in a search result set to identify the specific information item may be cumbersome and time consuming for the user.

SUMMARY

Embodiments of the present invention comprise methods and systems for retrieval of information items and associated sentence fragments. One aspect of one embodiment of the present invention comprises identifying at least a first entry in an index relevant to a search query and generating a search result set relevant to the search query comprising at least the first information item contained in the first entry. The first entry may also comprise a first associated sentence fragment, and the index may comprise a plurality of information items and associated sentence fragments.

This illustrative embodiment is mentioned not to limit or define the invention, but to provide one example to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Introduction

Figure 1:
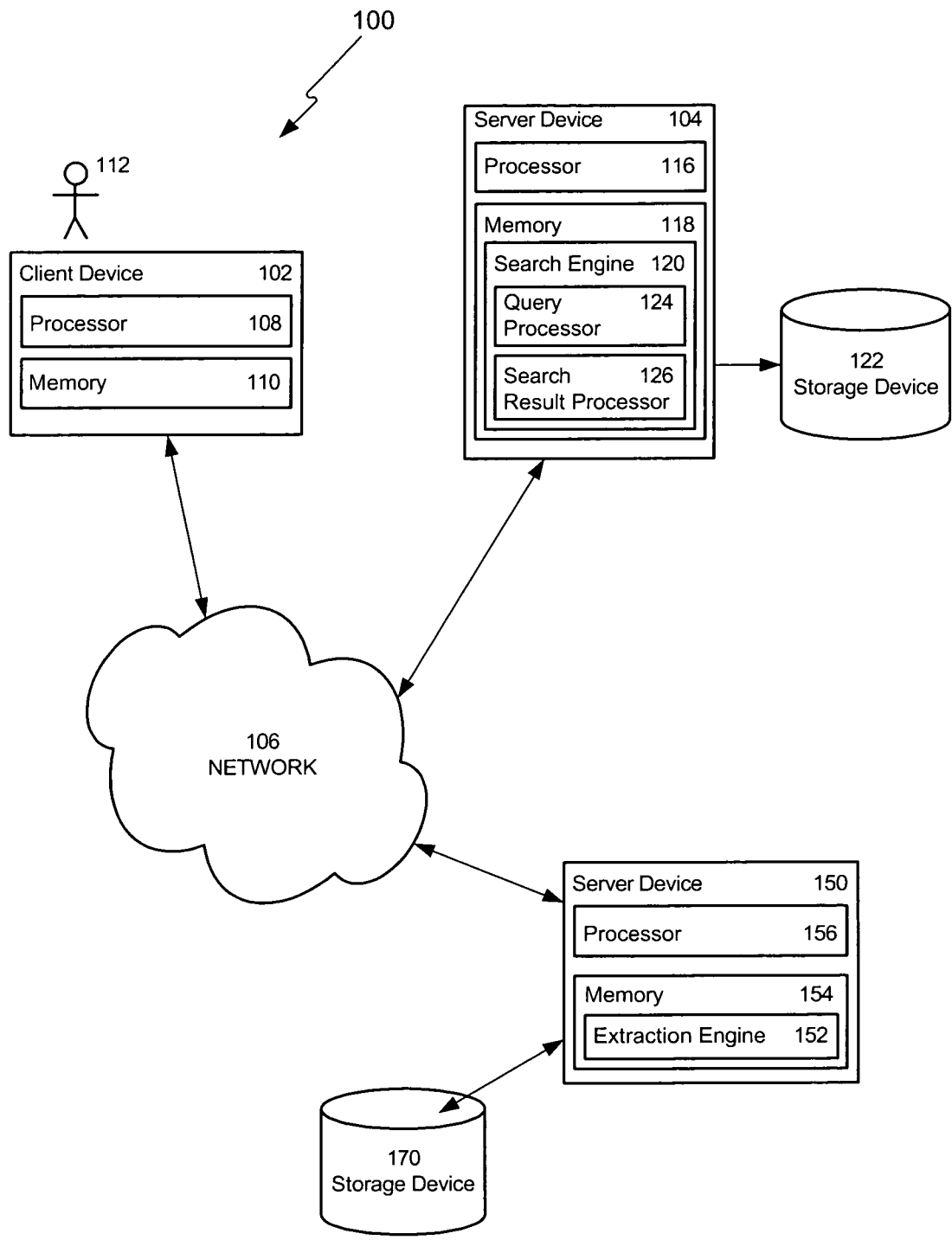
FIG. 1 shows a diagram of a system in accordance with one embodiment of the present invention.

Embodiments of the present invention comprise methods and systems for retrieval of information items and associated sentence fragments. There are multiple embodiments of the present invention. By way of introduction and example, one illustrative embodiment of the present invention provides a method for retrieving a specific information item (such as a date or entity name) and a sentence fragment associated with the information item in response to a search query. The information item and sentence fragment may be located in or otherwise associated with an index.

In one such method, the index includes a number of information items, such as dates, entity names, or concepts, and each information item in the index has an associated sentence fragment. The index may be created by extracting information items and associated sentence fragments from documents indexed by a search engine and/or documents from other suitable sources where the information is organized systematically in semi-structured form. An entry in the index can include an information item, such as a date, "1990", and an associated sentence fragment, "the newly unified Germany replaced West Germany as a NATO member." The date may be a date in close proximity to the associated sentence fragment extracted from a document or a date determined to be associated with the sentence fragment in another suitable manner. The method utilizes the index to identify index entries relevant to a search query. The identified entries are ranked, and the top ranked one or more entries are selected and included in a search result set, which can be output in response to the search query.

A user may enter a search query "Germany unified" and be interested in the date that this occurred. The entry provided in the example above can be identified from an index and included in a search result set sent to a user. Thus, a user viewing the search result set is provided with specific information, such as "1990—the newly unified Germany replaced West Germany as a NATO member," in response to the search query. A search result set can contain multiple information items and multiple associated sentence fragments. The search result set can also be displayed in a timeline format.

An information item, as used herein, may include a date, a name, such as of a person, place, or entity, and a concept. A sentence fragment, as used herein, may include a syntactic clause containing factual information. A sentence fragment may or may not be part of or associated with a complete sentence. A document, as used herein, may include web pages of various formats, such as HTML, XML, and XHTML, Portable Document Format (PDF) files, electronic mail messages, instant messenger messages, and word processor, database, and application program document files, audio, video, or any other documents or information of any suitable type whatsoever made available on a network, a personal computer, or other computing or storage means. The embodiments described herein are described generally in relation to HTML documents, but embodiments may operate on any suitable type of document.

This introduction is given to introduce the reader to the general subject matter of the application. By no means is the invention limited to such subject matter. Illustrative embodiments are described below.

System Architecture

Various systems in accordance with the present invention may be constructed. FIG. 1 is a diagram showing an illustrative system in which illustrative embodiments of the present invention may operate. The present invention may operate, and be embodied in, other systems as well.

Referring now to the drawings in which like numerals indicate like elements throughout the several figures, FIG. 1 is a diagram showing an illustrative environment for implementation of an embodiment of the present invention. The system 100 shown in FIG. 1 comprises a client device 102 in communication with a server device 104 via the network 106. FIG. 1 also shows a server device 150 in communication with the server device 104 over a network 106. In one embodiment, the network 106 shown comprises the Internet. The network may also comprise an intranet, a Local Area Network (LAN), a telephone network, or a combination of suitable networks. The client device 102 and server devices 104 and 150 may connect to the network through wired, wireless, or optical connections.

According to the embodiment shown in FIG. 1, the server device 104 can contain a search engine 120. The search engine may create a document index, such as a web page index, and store the indexed documents. The search engine may also create or have access to an information item index of information item—sentence fragment pairs. The search engine 120 can receive a search query from a client device 102 and locate information item—sentence fragment pairs and/or documents relevant to the query. The search engine 120 may output a search result set including information item—sentence fragment pairs and/or links to documents to the client device 102 in response to the search query.

According to the embodiment shown in FIG. 1, the server device 150 can contain an extraction engine 152. In one embodiment, the extraction engine 152 can create an information item index by extracting information item—sentence fragment pairs from documents indexed and stored by the search engine 120. The extraction engine 152 may also extract and index information item—sentence fragment pairs from documents contained in another corpus of documents. In one embodiment, the extraction engine 152 may reside on a client device, such as client device 102, or may reside in the search engine 120. The information item index may be located on storage device 170 or storage device 122 and may be accessed by search engine 120.

Client Devices

Examples of client device 102 are personal computers, digital assistants, personal digital assistants, cellular phones, mobile phones, smart phones, pagers, digital tablets, laptop computers, Internet appliances, and other processor-based devices. In general, a client device 102 may be any suitable type of processor-based platform that is connected to a network 106 and that interacts with one or more application programs. The client device 102 can contain a processor 108 coupled to a computer readable medium, such as memory 110. Client device 102 may operate on any operating system capable of supporting a browser or browser-enabled application, such as MICROSOFT WINDOWS or LINUX. The client device 102 is, for example, a personal computer executing a browser application program such as MICROSOFT CORPORATION'S INTERNET EXPLORER, NETSCAPE COMMUNICATION CORPORATION'S NETSCAPE NAVIGATOR, MOZILLA ORGANIZATION'S FIREFOX, APPLE COMPUTER, INC.'S SAFARI, OPERA SOFTWARE'S OPERA WEB BROWSER, and the open source LINUX BROWSER. A user 112 can interact with the client device 102 and browser application program to input search queries. The client device 102 can send search queries input by the user 112 to the search engine 120 and receive search result sets from the search engine 120. The client device 102 and browser application program can display the search result sets to the user 112.

Server Devices

The server devices 104 and 150 shown in FIG. 1 each contain a processor 116 and 156 coupled to a computer-readable medium, such as memory 118 and 154. Server devices 104 and 150 also contain computer readable medium storage devices 122 and 170, such as magnetic disk storage devices. Server devices 104 and 150, depicted as single computer systems, may be implemented as a network of computer processors. Examples of server devices 104, 150 are servers, mainframe computers, networked computers, processor-based devices, and similar types of systems and devices. Client processor 108, server processor 116 and server processor 156 can be any of a number of computer processors, as described below, such as processors from INTEL CORPORATION of Santa Clara, Calif. and MOTOROLA CORPORATION of Schaumburg, Ill.

Such processors may include a microprocessor, an ASIC, and state machines. Such processors include, or may be in communication with computer-readable media, which stores pre gram code or instructions that, when executed by the processor, cause the processor to perform actions. Embodiments of computer-readable media include, but are not limited to, an electronic, optical, magnetic, or other storage or transmission device capable of providing a processor, such as the processor 116 of server device 104, with computer-readable instructions. Other examples of suitable media include, but are not limited to, a floppy disk, CD-ROM, DVD, magnetic disk, memory chip, ROM, RAM, an ASIC, a configured processor, optical media, magnetic tape media, or any other suitable medium from which a computer processor can read instructions. Also, various other forms of computer-readable media may transmit or carry program code or instructions to a computer, including a router, private or public network, or other transmission device or channel, both wired and wireless. The instructions may comprise program code from any computer-programming language, including, for example, C, C++, C#, VISUAL BASIC, JAVA, PYTHON, PERL, and JAVASCRIPT. Program code running on the server devices 104 and 150 may include web server software, such as the open source APACHE WEB SERVER and the INTERNET INFORMATION SERVER (IIS) from MICROSOFT CORPORATION.

Search Engine

Memory 118 of the server device 104 contains a search engine application program, also known as a search engine 120. The search engine 120 comprises a software application including program code executable by the processor 116 or a hardware application that is configured to facilitate locating indexed information item—sentence fragment pairs relevant to search queries received from a client device 102. The search engine 120 may also be configured to create an index of documents and locate indexed documents relevant to a search query from the client device 102. The indexed information item—sentence fragment pairs and indexed documents may be stored in the storage device 122. The search engine 120 illustrated in FIG. 1 comprises a query processor 124 and search result processor 126.

In one embodiment, the query processor 124 processes a received search query by, for example, identifying tokens in the search query and removing unnecessary tokens or words, such as stop words, from the search query. In one embodiment, the search result processor 126 identifies information item—sentence fragment pairs from an information item index relevant to a processed search query received from the query processor 124. The search result processor 126 may also rank the identified information item—sentence fragment pairs and create a search result set including one or more information item and associated sentence fragment. The search result set may also include links to documents identified by the search result processor 126 as relevant to the search query. The search result processor 126 may output the search result set via the network 106 to the client device 102 that sent the search query.

Extraction Engine

Memory 154 of the server device 150 contains an information extraction application program, also known as an extraction engine 152. The extraction engine 152 comprises a software application including program code executable by the processor 156 or a hardware application that is configured to facilitate identifying and extracting information item—sentence fragment pairs to create an index of information item—sentence fragment pairs. The extraction engine 152 may identify a document in an index relating to any suitable corpus of documents. The extraction engine 152 may access documents indexed by the search engine 120 to identify and extract information item—sentence fragment pairs. The extraction engine may also access an index of semi-structured information, such as, for example, encyclopedias and dictionaries. In the case of encyclopedias, the information items may be the subjects in the encyclopedia and the sentence fragments may be part of subjects' associated articles. With dictionaries, the information items may be words and the sentence fragments may be the words' associated definitions.

It should be noted that the present invention may comprise systems having different architecture than that which is shown in FIG. 1. For example, in some systems according to the present invention, extraction engine 152 may be contained in search engine 120. The system 100 shown in FIG. 1 is merely illustrative, and is used to help explain the illustrative systems and processes discussed below.

Figure 2:
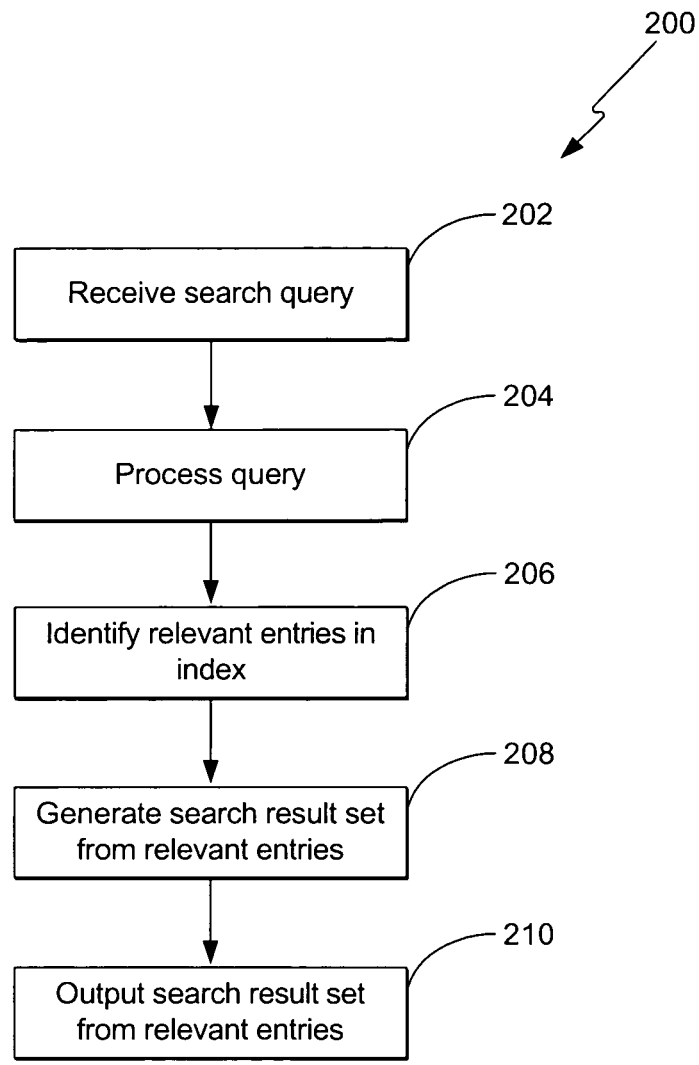
FIG. 2 shows one embodiment of an illustrative method according to one embodiment of the present invention.

Illustrative Process for Retrieving Information Items and Associated Sentence Fragments Various methods in accordance with embodiments of the present invention may be carried out. FIG. 2 illustrates an illustrative method 200 for retrieving information items and associated sentence fragments from an index that may be implemented by search engine 120 shown in FIG. 1. This illustrative method is provided by way of example, as there are a variety of ways to carry out methods according to the present invention. The method 200 shown in FIG. 2 can be executed or otherwise performed by one or a combination of various systems. The system shown in FIG. 1 and described above is used for illustration purposes.

Figure 5:
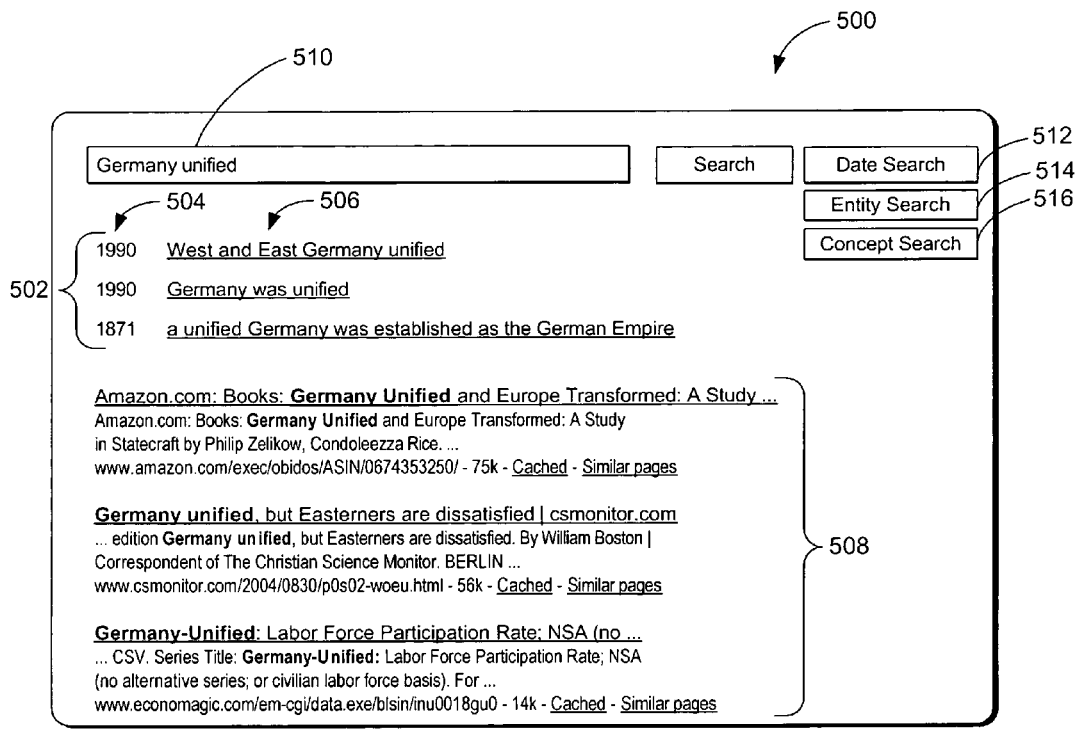
FIG. 5 shows an illustrative search engine interface and search results document according to one embodiment of the present invention.

The illustrative method 200 begins in block 202 where a search query is received. The search query can be received from a client device 102 over a network 106 by query processor 124. In one embodiment, a user 112 may enter a search query in a browser application on the client device 102. The search query may indicate that the user is interested in one or more information items. In one embodiment, the user may select an information item search through the search engine interface on the browser application. For example, FIG. 5 shows an illustrative embodiment of a search engine interface and results page 500. The search engine interface shown in FIG. 5 includes information item search buttons, such as buttons for Date Search 512, Entity Search 514, and Concept Search 516. In this example, the user 112 can enter a search query, such as "Germany unified", in a search field 510 and select the "Date Search" button 512 to indicate that the user is interested in a date or dates associated with "Germany unified". Alternatively, the search engine interface may allow a user to select a preference so that information items are included in search result sets. In one embodiment, the query processor 124 may identify that the search query seeks an information item, such as a date or name. For example, if the search query received is "when was Germany unified", the query processor 124 can identify the term "when" and interpret the query as looking for a date or dates associated with "Germany unified".

The wh-term ("when") is just one of the explicit or implicit clues that a query may contain to indicate that the desired result is a date. In order to capture other forms, such as "What year" in "What year was Germany unified", or "What day" in "What day was Germany unified", the queries may be parsed to identify the relevant phrase defining the type of the expected results ("year", "day" etc.). The phrase is then mapped via rules into existing sets of target nouns, which is associated in turn with a desired type of results, in this case a date. Alternatively, search queries seeking dates may be identified through pattern matching, where each pattern captures one of the possible rules ("When"; "What" followed by "day"; "What" followed by "year"; etc.). The mapping of natural language queries into types of desired results, such as, dates vs. cities vs. countries vs. person names has been studied in previous work on information extraction and question answering and is known to those skilled in the art.

In one embodiment, users have the option of entering their queries as a set of keywords rather than full natural-language queries, and manually selecting the desired type of results that they are looking for, such as a date, for example.

In block 204 the search query is processed. In one embodiment, the search query is received by the search engine 120 as a string of characters. The query processor 124 may process the search query by parsing the string of characters and then tokenizing the string of characters. Tokenization of the search query can include parsing the string of characters that makes up the search query into known tokens, such as words, punctuation marks, and special characters, based on a lexicon. In addition, the search query may be processed more deeply to identify the part of speech tags associated with the query words, or organize the words into a syntactic parse tree if the search query is expressed in natural language. The query processor 124 may then remove stop words from the search query. Examples of stop words are determiners, conjunctions, and words beginning with the letters "wh". The search query may be further processed by the query processor 124 to identify it as seeking an information item, such as described above.

After the search query is processed, relevant entries in the index are identified in block 206. As explained above, each entry in the information item index can include an information item and an associated sentence fragment. The extraction engine 152 can create the index by accessing documents indexed by the search engine 120 to identify and extract information item—sentence fragment pairs.

The extraction engine 152 may use a lightweight extraction method to identify and extract an information item and associated sentence fragment from a document previously indexed by a search engine 120, for example. The extraction method can identify an information item, such as a date, in the text of a document and match a pattern to identify a sentence fragment in close proximity to the date. One or more of a set of lexico-syntactic patterns can be used to identify a sentence fragment associated with the information item. Once identified, the sentence fragment may be filtered to exclude ambiguous or otherwise unhelpful sentence fragments. An identified sentence fragment that is not filtered is extracted with its corresponding information item and the information item—sentence fragment pair is indexed together. The extraction method can be used on all or most of the documents in a corpus of documents to create an index of information item—sentence fragment pairs. The extraction of information item—sentence fragment pairs to create an index is described in U.S. patent application Ser. No. 11/087,447, filed Mar. 23, 2005, entitled "Methods and Systems for Extracting an Information Item and Associated Sentence Fragment from a Document," which is incorporated herein in its entirety by reference.

In response to a received search query, the query processor 124 may access the information item index to identify relevant entries in the index by matching words or terms from the search query to words or terms contained in the entries. In one embodiment, the query processor 124 can match words from the search query with the associated sentence fragments, the information items, or both to identify relevant entries in the information item index. Table 1 below illustrates some exemplary index entries matched to the search query, "Germany unified" for a date search.

TABLE 1

| Information Item | Sentence Fragment |
|---|---|
| 1990 | the newly unified Germany replaced West Germany as a NATO member |
| 1990 | West and East Germany unified |
| 1990 | Kohl became the first chancellor of a unified Germany since 1945 |
| 1990 | a unified Germany became a reality |
| 1990 | Kohl was able to usher in a unified Germany |

TABLE 1-continued

| Information Item | Sentence Fragment |
|---|---|
| 1990 | Germany was unified |
| 1989 | the Berlin Wall fell paving the way for a unified Germany |
| 1989 | Chancellor Kohl presented his Ten-Point Plan for a unified Germany to the Bundestag |
| 1949 | Germany was divided into the German Democratic Republic and the Federal Republic of Germany ending a unified Germany |
| 1933 | Hitler was appointed Chancellor of a unified Germany |
| 1871 | Bismark succeeded in placing Wilhelm on the throne of a unified Germany |
| 1871 | Germany was unified under Emperor Wilhelm I |
| 1871 | a unified Germany was established as the German Empire |

In block 208 a search result set is generated from the relevant entries identified in block 206. The search result processor 126 may generate a search result set by ranking the identified relevant entries. The search result set may contain some or all of the ranked entries. In one embodiment, the search result set may contain one or more information items and one or more associated sentence fragments for each of the information items. In another embodiment, the search result set may include several information items and an associated sentence fragment for each information item, such as in timeline form.

Figure 3:
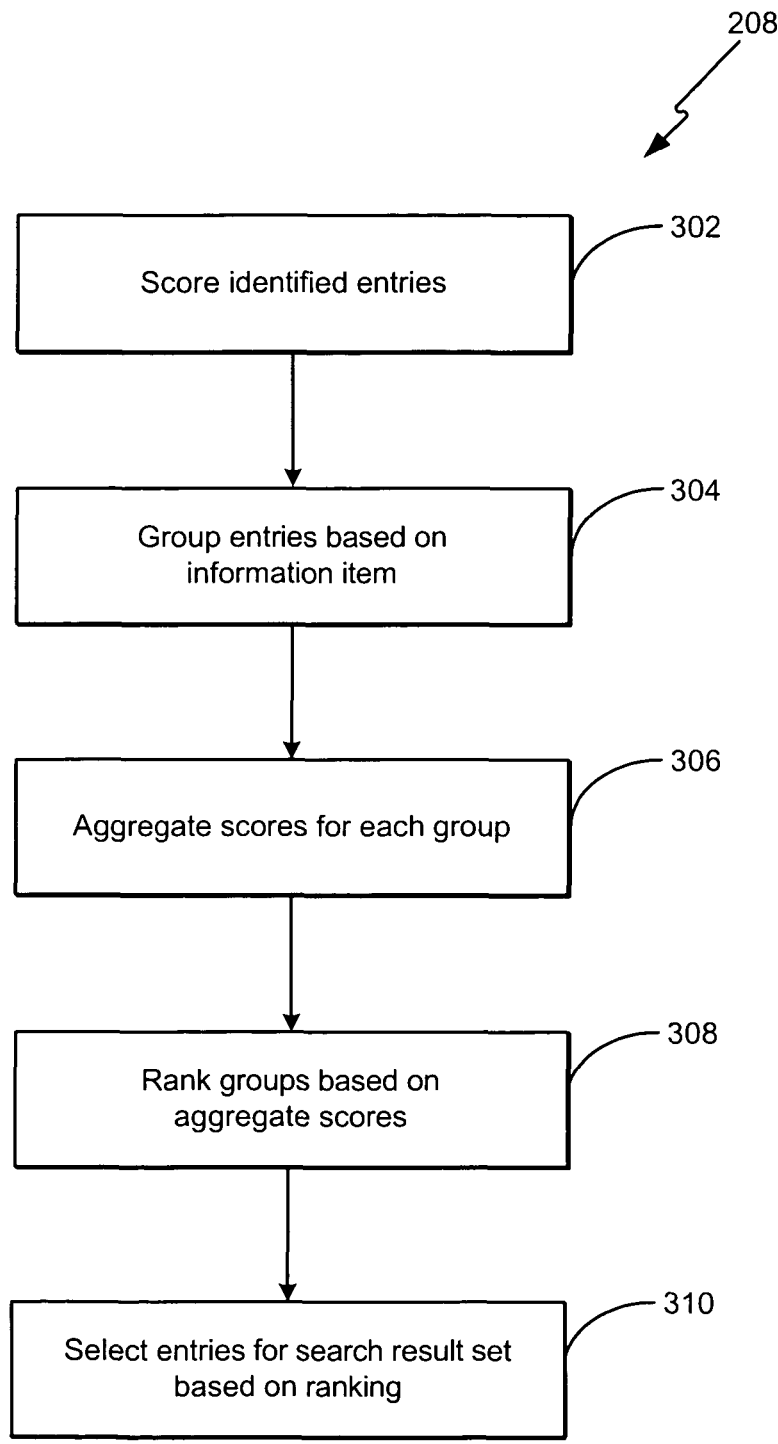
FIG. 3 shows one embodiment of another illustrative method according to one embodiment of the present invention.

FIG. 3 illustrates an example of method 208 used to generate a search result set. In block 302, the identified entries from block 206 are scored. In one embodiment, the search result processor 126 computes a relevance score for each of the identified entries in block 206 using a relevance score formula. The relevance score formula can favor sentence fragments having search terms appearing closer to each other and sentence fragments that have a smaller number of overall terms. In one embodiment, Formula 1 below is used to compute relevance scores for sentence fragments:

$$C \times \frac{\sum_{i,j=1,n} 1/Dist(i, j)}{V + 1} \quad \text{Formula 1}$$

In Formula 1 above, Dist (i, j) is the minimum distance among matches of query terms in the sentence fragment, computed over all pairs (i, j) of non-stop query terms. Dist(i, j) equals 1 if there is only a single non-stop term in the query. V is the number of terms in the sentence fragment that are not stop terms. C is a score scaling constant. In one embodiment, C is set to 100. The effect of Formula 1 is to promote entries that contain search terms appearing close together in a sentence fragment and sentence fragments with a smaller number of terms by scoring such entries higher.

In block 304, the identified relevant entries are grouped based on the associated information item. The search result processor 126 may group entries with the same information items into groups. For the example shown in Table 1 above, all entries with the date 1990 are grouped together, all entries with the date 1989 are grouped together, all entries with the date 1949 are grouped together, all entries with the date 1933 are grouped together, and all entries with the date 1871 are grouped together.

In block 306, the relevance scores for each entry are aggregated for each group. In one embodiment, the search result processor 126 adds the relevance scores for all of the entries in each group together. For the example shown in Table 1, the relevance scores for the 1990 group are added together, the relevance scores for the 1989 group are added together, and the relevance scores for the 1871 group are added together. For the 1949 group and the 1933 group, the relevance score for these entries are used, because there is only one entry for each of these two groups. This results in groups with a greater number of entries generally scoring higher than groups with a lower number of entries.

In block 308, the groups are ranked based on each group's aggregate score. In one embodiment, the search result processor 126 ranks groups higher with greater aggregate scores. For example, if the 1990 group has an aggregate score of 700, the 1989 group has an aggregate score of 250, the 1949 group has an aggregate score of 110, the 1933 group has an aggregate score of 150, and the 1871 group has an aggregate score of 400, then the search result processor 126 may rank the groups as follows: 1990; 1871; 1989; 1933; and 1949.

In block 310, entries are selected for a search result set based on the ranking of groups. The search result processor 126 may identify and select an entry or multiple entries from one or more groups to include in the search result set. In one embodiment, the information item and associated sentence fragment are included in the search result set. In another embodiment, only the information items from each selected entry are included in the search result set. The search result processor 126 can use a variety of rules to select the entries that form the search result set. For example, the search result processor 126 may only select entries from the top one or two groups or may select an entry or entries out of a group if the group scores above a predetermined threshold. The search result processor 126 may use similar rules in selecting entries from the groups, such as selecting the top scoring one or two entries from a group. For the example discussed above in connection with Table 1, only groups 1990 and 1871 may be selected based on these two groups having the highest two aggregate relevance scores. From the 1990 group top scoring two entries may be selected and from the 1871 group the top scoring entry may be selected. For example, Table 2 below illustrates an example of the entries selected for the search result set from Table 1.

TABLE 2

| Information Item | Sentence Fragment |
|---|---|
| 1990 | West and East Germany unified |
| 1990 | Germany was unified |
| 1871 | a unified Germany was established as the German Empire |

Figure 4:
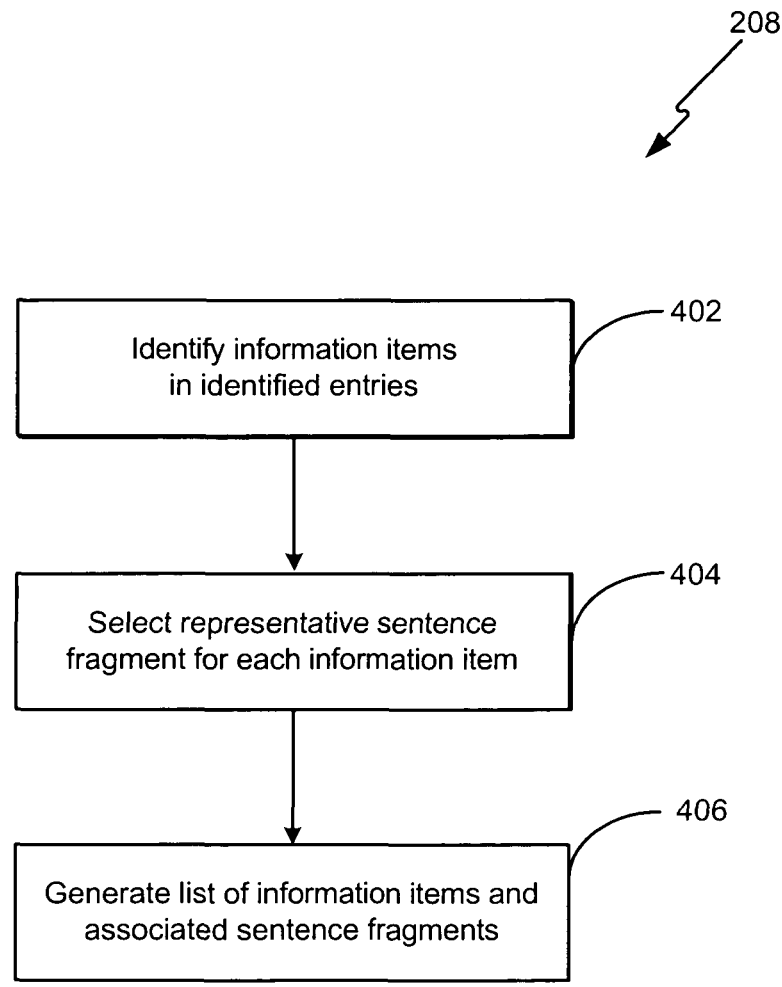
FIG. 4 shows one embodiment of another illustrative method according to one embodiment of the present invention.

FIG. 4 illustrates an exemplary method 208 for generating a search result set such as a timeline from the relevant entries identified in 206. In block 402 the search result processor 126 identifies information items in the entries identified as relevant in block 206. In one embodiment, the search result processor 126 may identify all information relevant information items to include in the search result set. For example, in Table 1 above, the search result processor can identify all dates, 1990, 1989, 1949, 1933, and 1871, from the relevant entries to include in the search result set. In another embodiment, the search result processor 126 uses a scoring formula similar to Formula 1 to identify and select entries. For example, the search result processor 126 may only include information items in the search result set that are associated with entries above a certain scoring threshold.

In block 404, a representative sentence fragment for each identified information item in block 402 is selected. In one embodiment, the search result processor 126 calculates a relevance score for each identified relevant entry and selects one entry having the highest relevance score for each entry associated with the identified information items. For example, if all of the information items in Table 1 are identified in block 402, the search result processor can use a relevance score associated with each entry to select the sentence fragment to associate with each information item. For the date 1990, for example, the search result processor may select the sentence fragment "West and East Germany unified" if this sentence fragment has the highest associated relevance score compared to the other entries associated with the date 1990.

In another embodiment, the search result processor 126 may generate a new sentence fragment to associate with each identified information item. In this embodiment, for example, the search result processor 126 may generate the fragment "unified" to associate with the date 1990 and may generate the fragment "divided" to associate with the date 1949.

In block 406, a set of information items and associated sentence fragments is generated. For example, the search result processor 126 may generate a timeline including dates and an associated sentence fragment for each date.

Returning to FIG. 2, in block 210, the search result set is output. In one embodiment, the search engine 120 outputs the search result set to the client device 102 in response to the search query received from the client device 102. The search engine can send the search result set to the client device via network 106.

FIG. 5 shows an illustrative search engine interface and search results page 500 including a search result set 502 generated, for example, by the method 208 described in FIG. 3 for a date search. The search result set 502 includes information items (dates) 504 and associated sentence fragments 506. The sentence fragments may not be shown with the associated information item. When the sentence fragments are shown with the associated information item they can provide a user with a justification for the display of the information item. For example, if a user is interested in the recent unification of Germany, he can disregard the 1871 date provided for the nineteenth century unification of Germany.

In one embodiment, the information items 504 and/or the sentence fragments 506 may be a hyperlink to the document from which the information item and associated sentence fragment were extracted. A user may select the sentence fragment and be linked to the document containing the information item and sentence fragment. The search results page 500 also includes web search results 508 for documents relevant to the search query.

Figure 6:
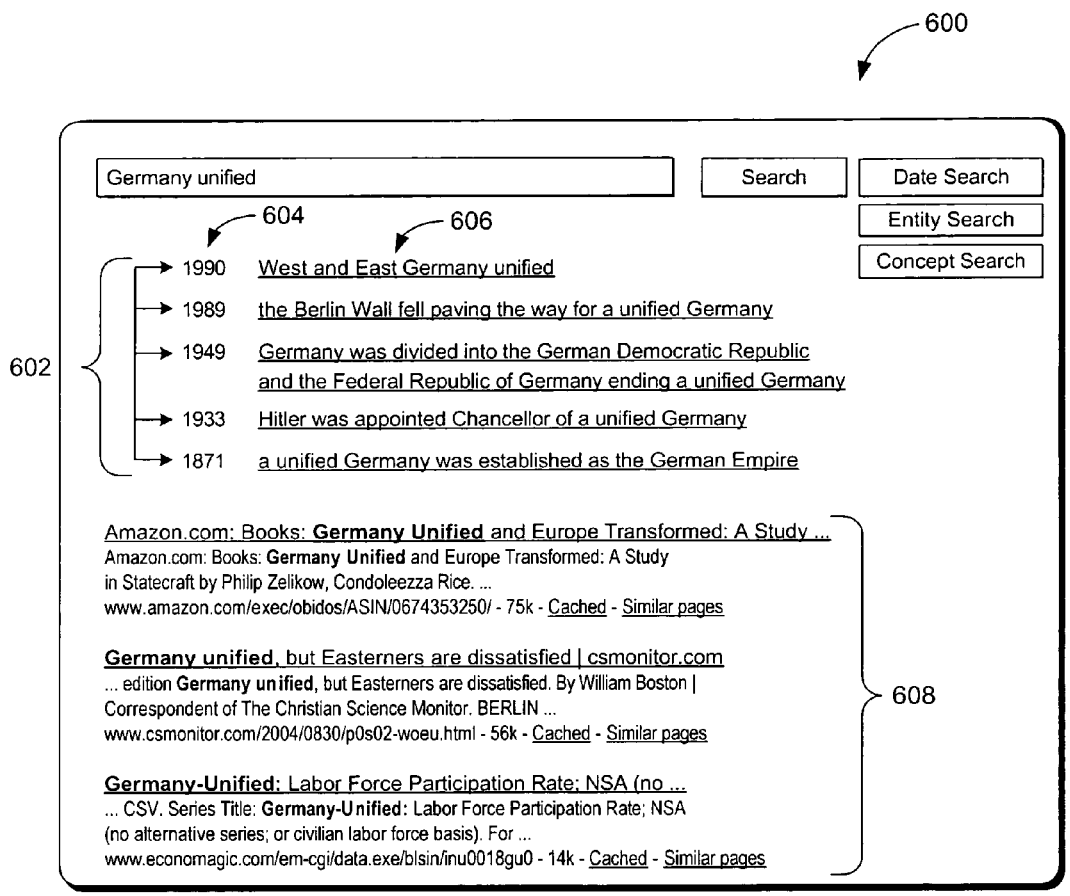
FIG. 6 shows an illustrative search engine interface and search results document according to one embodiment of the present invention.

FIG. 6 shows an illustrative search engine interface and search results page 600 including a search result set 602 generated, for example, by the method 208 described in FIG. 4 for a date search. The search result set 602 includes information items (dates) 604 and associated sentence fragments 606 and is displayed in timeline form. In one embodiment, the information items 604 and/or the sentence fragments 606 may be a hyperlink to the document from which the information item and associated sentence fragment were extracted. The search results page 600 also includes web search results 608 for documents relevant to the search query. In another embodiment, the search results page may display a hyperlink indicating a timeline at the top of the web search results, for example. A user can select the timeline hyperlink to cause the browser application to display a separate web page displaying the timeline.

Figure 7:
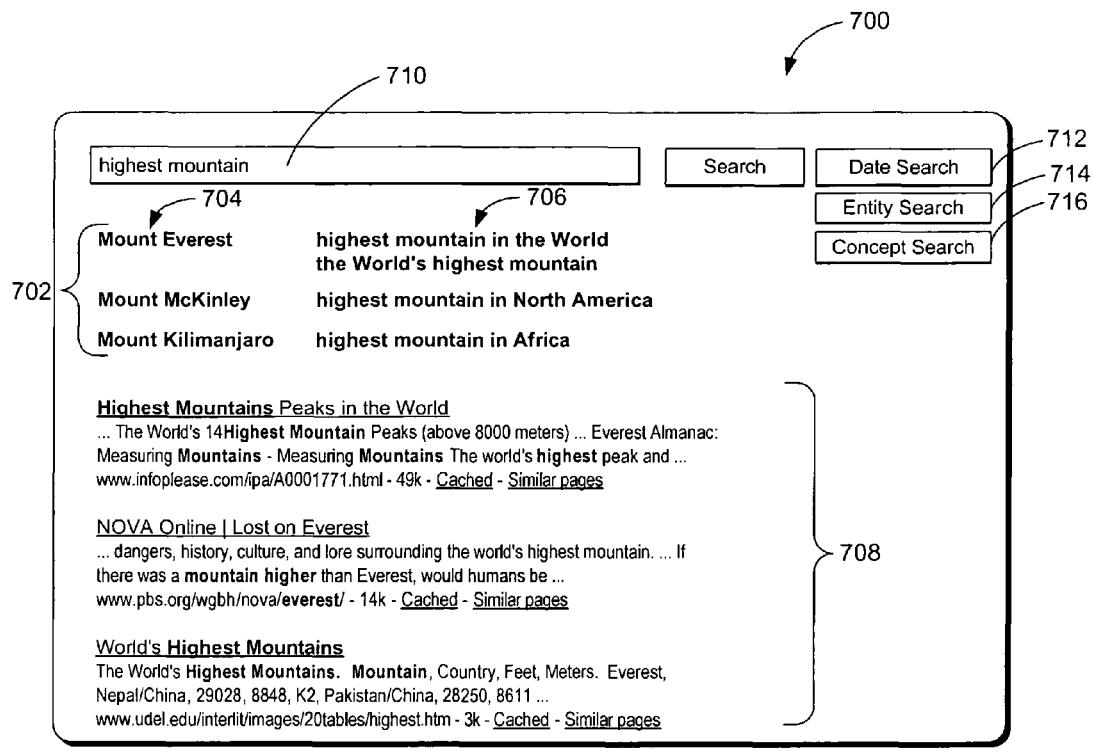
FIG. 7 shows an illustrative search engine interface and search results document according to one embodiment of the present invention.

FIG. 7 shows an illustrative search engine interface and search results page 700 including a search result set 702 generated for an entity search. The search result set 702 includes information items, in this example entity names 704, and associated sentence fragments 706. The displayed entity names 704 are relevant to the search terms "highest mountain" entered into the search box 710. The associated sentence fragments 706 provide an indication of why each entity name 704 is displayed. For example, "Mount Everest" is displayed because it is the "highest mountain in the World" and "the World's highest mountain." In one embodiment, multiple sentence fragments may be displayed for some or all of the displayed entity names 704. Alternatively, no sentence fragments may be displayed for the displayed entity names 704. In one embodiment, the information items 704 and/or the sentence fragments 706 may be a hyperlink to the document from which the information item and associated sentence fragment were extracted. The search results page 700 also includes web search results 708 for documents relevant to the search query.

Figure 8:
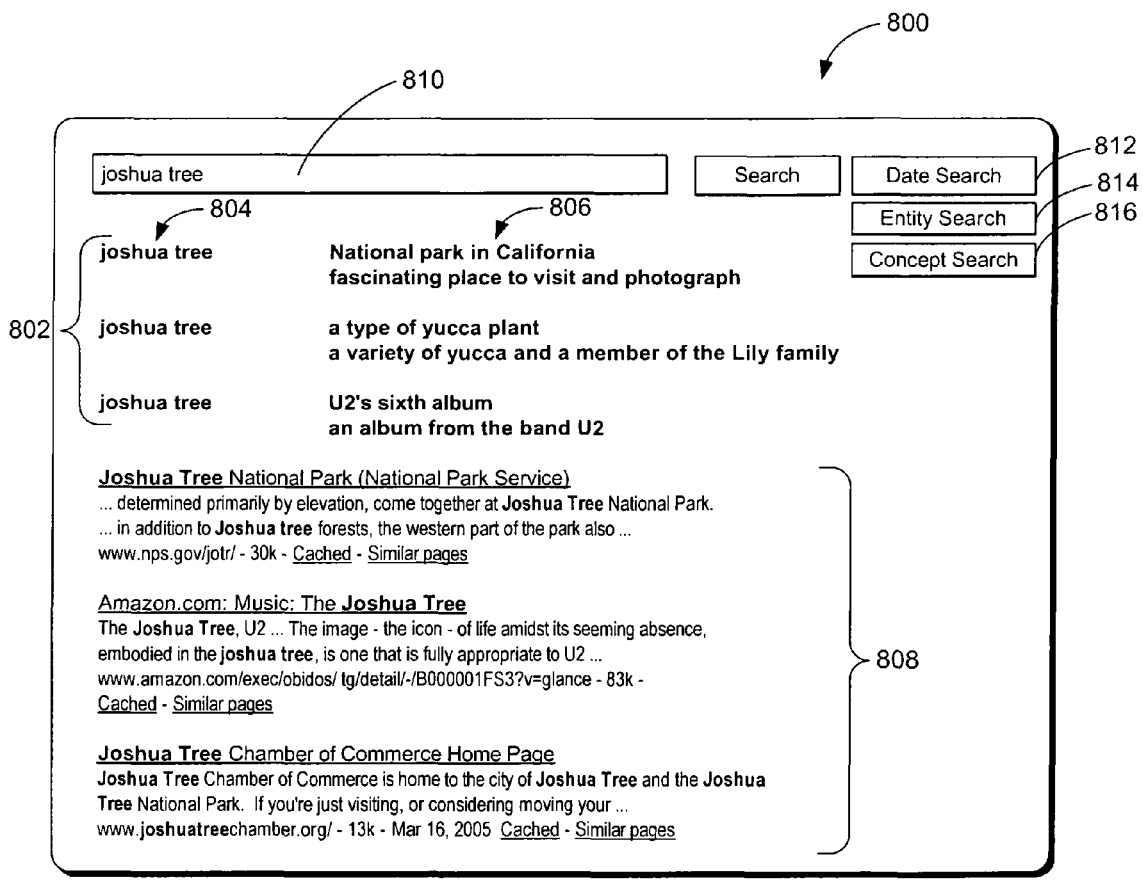
FIG. 8 shows an illustrative search engine interface and search results document according to one embodiment of the present invention.

FIG. 8 shows an illustrative search engine interface and search results page 800 including a search result set 802 generated for a concept search. The search result set 802 includes information items, in this example concepts 804, and associated sentence fragments 806. The displayed concepts 804 match the search term "joshua tree" entered into the search box 810. The associated sentence fragments provide an indication of the different concepts associated with the term "joshua tree" and, in the example of FIG. 8, two sentence fragments for each concept are displayed. For example, the sentence fragments 806 indicate that the term "joshua tree" is associated with the concepts of a national park, a plant, and a music album.

In one embodiment, one or more than two sentence fragments 806 may be displayed for some or all of the displayed information items (concepts) 804. In one embodiment, the information items 804 and/or the sentence fragments 806 may be a hyperlink to the document from which the information item and associated sentence fragment were extracted. The search results page 800 also includes web search results 808 for documents relevant to the search query.

Figure 9:
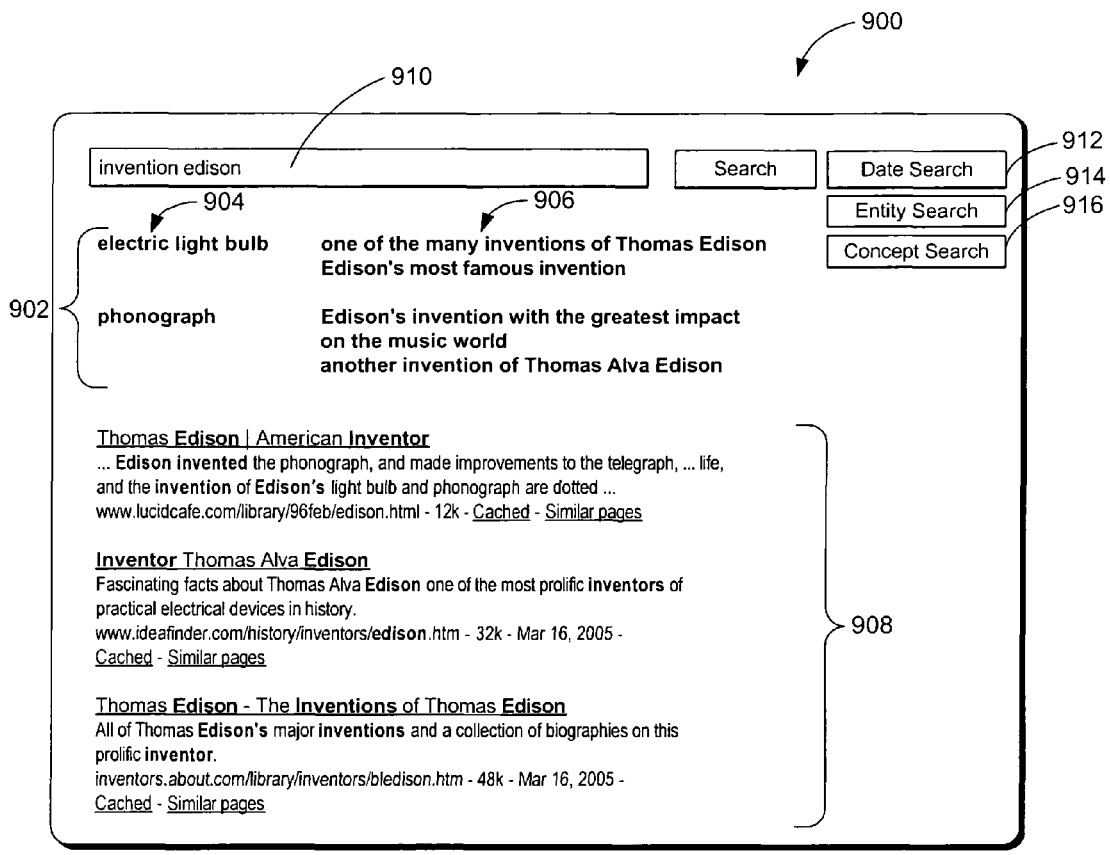
FIG. 9 shows an illustrative search engine interface and search results document according to one embodiment of the present invention.

FIG. 9 shows an illustrative search engine interface and search results page 900 including a search result set 902 generated for a concept search. The search result set 902 includes information items, in this example concepts 904, and associated sentence fragments 906. The displayed concepts 904 match the search terms "invention edison" entered into the search box 910. The concepts 904 provide an indication of the different concepts associated with the search terms "invention edison". For example, the two concepts 904 displayed are "electric light bulb" and "phonograph". The associated sentence fragments 906 provide a justification for the displayed concepts 904. For example, the sentence fragments indicate that "electric light bulb" and "phonograph" were inventions from Thomas Edison. More or less sentence fragments for each concept 904 can be displayed.

In one embodiment, the information items 904 and/or the sentence fragments 906 may be a hyperlink to the document from which the information item and associated sentence fragment were extracted. The search results page 900 also includes web search results 908 for documents relevant to the search query.

In the embodiment shown in FIG. 8, the search result set 802 is generated by matching the search query with information items in an information item index. For example, in FIG. 8, the search query "joshua tree" is matched with information items containing the term "joshua tree" by the query processor 124 to identify relevant entries in the index. The search results processor 126 then generates a search result set from the relevant entries.

In the embodiments shown in FIGS. 5, 6, 7 and 9, the search results sets 502, 602, 702 and 902 are generated by matching the search query with sentence fragments in an information item index. For example, in FIG. 9, the search query "invention edison" is matched with sentence fragments containing the words "invention" and "edison" by the query processor 124 to identify relevant entries in the index. The search results processor 126 then generates a search result set from the relevant entries.

Whether the query processor 124 searches the information items or sentence fragments in an information item index when identifying relevant entries can be determined automatically or manually. For example, in one embodiment, the query processor 124 may first search the information items for matches with the search query. In this example, if no information item matches are identified, the query processor 124 will search the sentence fragments in the information item index to identify matches. In one embodiment, the search results processor 126 may cause a prompt to be displayed to the user before searching the sentence fragments. For example, the prompt may say "The search of information items produced no results. Please click OK to search sentence fragments."

In one embodiment, the user can manually select whether the query processor 124 searches the information items of sentence fragments. For example, the user can indicate a preference in a search options page associated with the search engine interface or the search engine interface may provide a choice as to searching information items or sentence fragments or both.

General

While the above description contains many specifics, these specifics should not be construed as limitations on the scope of the invention, but merely as exemplifications of the disclosed embodiments. Those skilled in the art will envision any other possible variations that are within the scope of the invention.

That which is claimed:

1. A method comprising:
   based on a search query, using a computer server system having one or more processors to select a first entry in an index that is stored at a storage device, wherein the first entry is relevant to the search query and comprises a first information item and a first sentence fragment, wherein the first sentence fragment and the first information item are extracted from text of a first electronic document and wherein the first sentence fragment differs from the first information item;
   generating a search result set comprising at least the first information item of the first entry using the computer server system; and
   outputting the search result set from the computer server system for use by a client device.

2. The method of claim 1, wherein the first information item comprises an entity name.

3. The method of claim 2, wherein the entity name comprises at least one of a name of a person, a name of a place, and a name of an organization.

4. The method of claim 1, wherein the selecting the first entry in the index comprises identifying that the first sentence fragment includes a term in the search query.

5. The method of claim 1, wherein the search result set further comprises the first sentence fragment.

6. The method of claim 1, wherein the selecting the first entry comprises computing a relevance score.

7. The method of claim 6, wherein the relevance score is based on at least one of a number of words in the first sentence fragment, a number of stop words in the first sentence fragment, a total number of words in the first sentence fragment, and a minimum distance between matches of search query terms in the first sentence fragment.

8. The method of claim 6, wherein the relevance score computation favors sentence fragments having search terms appearing relatively closer to one another therein over sentence fragments having search terms appearing relatively farther from one another therein.

9. The method of claim 6, wherein the relevance score computation favors sentence fragments having a relatively smaller number of non-stop terms therein over sentence fragments having a relatively larger number of non-stop terms therein.

10. The method of claim 1, wherein the search result set comprises a plurality of information items and associated sentence fragments.

11. The method of claim 10, wherein the search result set comprises a timeline.

12. The method of claim 1, wherein the selecting the first entry comprises matching the search query with the first information item.

13. The method of claim 1, wherein the selecting the first entry comprises matching the search query with the first sentence fragment.

14. The method of claim 1, wherein the selecting the first entry comprises identifying that terms in the search query appear in the first sentence fragment.

15. The method of claim 1, further comprising identifying a category of an information item to be included in the search result set.

16. The method of claim 15, wherein selecting the category of the information item comprises parsing the search query to identify wh-terms.

17. The method of claim 15, wherein selecting the category of the information item comprises identifying user interaction with an element of a user interface that identifies the category.

18. The method of claim 1, further comprising indexing an indexed collection of documents to form the index.

19. The method of claim 1, wherein:
the index comprises a collection of entries that each comprises an information item and a sentence fragment;
the information items in the index each comprise one of a date, an entity name, and a concept; and
the sentence fragments in the index each comprise factual information related to and found in close proximity in text of an electronic document to the information item in a same entry.

20. An article comprising a non-transitory computer-readable data storage medium storing program code configured to cause one or more machines to perform operations, the operations comprising:
based on a search query, selecting a first entry in an index stored at a storage device, wherein the first entry is relevant to the search query and comprises a first information item and a first sentence fragment, wherein the first sentence fragment and the first information item are found in close proximity in text of an electronic document and the first sentence fragment differs from the first information item;
generating a search result set comprising at least the first information item of the first entry; and
outputting the search result set.

21. The article of claim 20, wherein the selecting the first entry in the index comprises identifying that the first sentence fragment includes a term in the search query.

22. The article of claim 20, wherein the search result set comprises the first sentence fragment.

23. The article of claim 20, wherein:
the index comprises a collection of entries that each comprises an information item and a sentence fragment;
the information items in the index each comprise one of a date, an entity name, and a concept; and
the sentence fragments in the index each comprise factual information related to and found in close proximity in text of a document to the information item in a same entry.

24. A system comprising:
a storage device storing an index comprising a collection of entries, each entry comprising a date and a sentence fragment found in close proximity in text of an electronic document, wherein the sentence fragment in each entry differs from an information item in that entry;
a server device comprising one or more computer processors, the server device configured to execute program code, the program code including:
a search engine to select a first entry in the collection of entries that is relevant to a search query, and
an information extraction application program to generate a search result set comprising at least a first information item included in the first entry; and
a client device in communication with the server device via a data communication network to receive the search result set outputted from the server device.

25. The system of claim 24, wherein the client device comprises a processor-based platform that includes a display of the search result set, the display comprising the first information item and a first sentence fragment included in the first entry.

* * * * *